March 9, 1965 N. MARCHAK 3,172,571
COLLAPSIBLE DISPENSING TUBE
Filed June 21, 1961 3 Sheets-Sheet 1
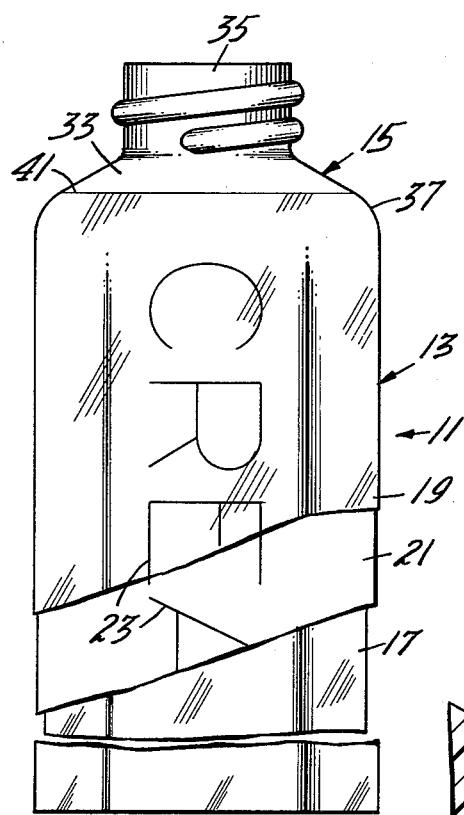
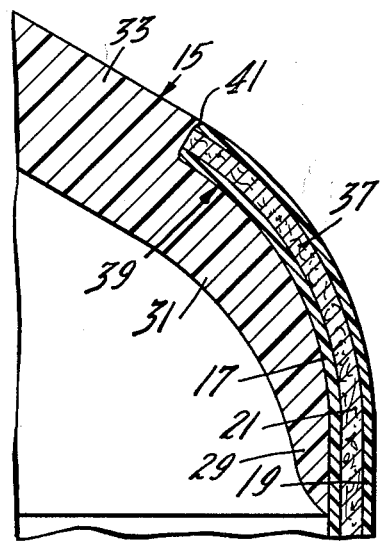
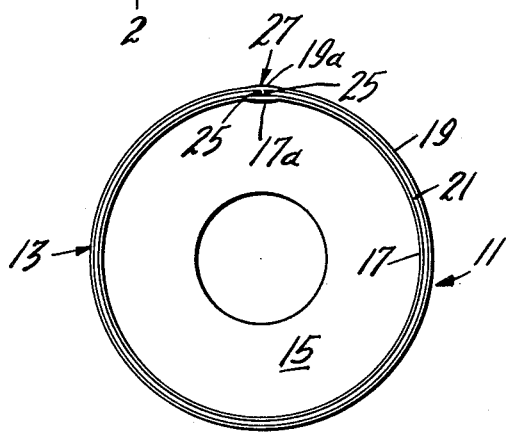
INVENTOR.
NICHOLAS MARCHAK
BY John H. Midney
George W. Reiber
ATTORNEYS

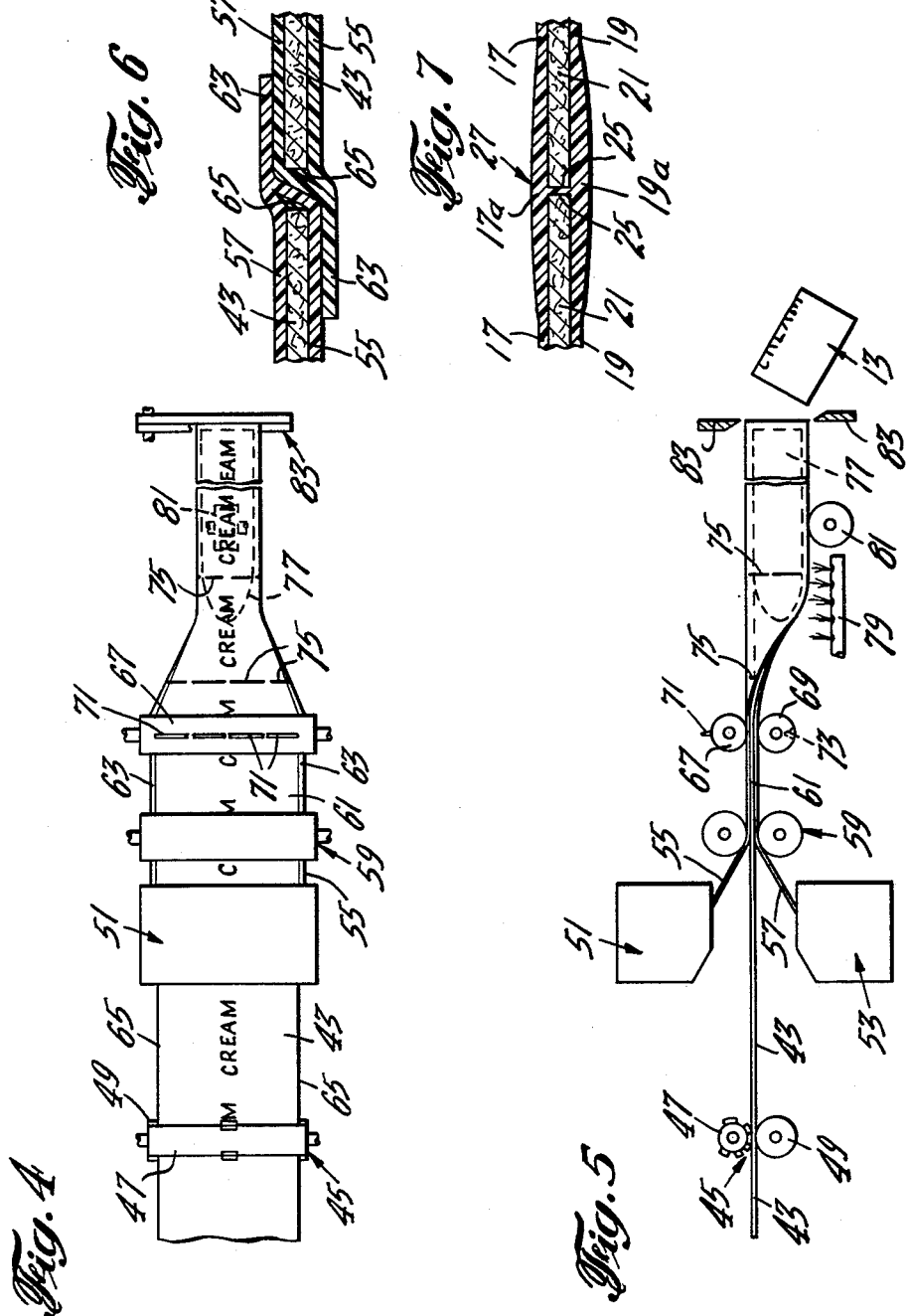

March 9, 1965 N. MARCHAK 3,172,571
COLLAPSIBLE DISPENSING TUBE
Filed June 21, 1961 3 Sheets-Sheet 3

INVENTOR.
NICHOLAS MARCHAK
BY John H. Midney
George W. Reiber
ATTORNEYS

United States Patent Office 3,172,571
Patented Mar. 9, 1965

3,172,571
COLLAPSIBLE DISPENSING TUBE
Nicholas Marchak, Martinsville, N.J., assignor to American Can Company, New York, N.Y., a corporation of New Jersey
Filed June 21, 1961, Ser. No. 118,697
8 Claims. (Cl. 222—107)

The present invention relates to collapsible dispensing tubes, and more particularly to tubes formed from a laminated material and a simplified method of making such tubes.

Collapsible dispensing tubes made of both metallic and plastic materials are well-known. The metal tubes are impermeable to moisture and volatile oils and, therefore, are widely used for packaging pharmaceutical products, cosmetics, toiletries and the like which contain these ingredients. They are also impervious to oxygen and hence capable of protecting a contained product against deterioration from this source. However, the metal tubes such as are made from lead or aluminum are costly to produce both because of the high material cost and the manner in which the tubes must be made including individually printing suitable decorative material on each tube after it has been formed. Moreover, the chemical nature of the metals used often makes necessary the extra step of completely coating the interior of the tube with a protective layer so as to preclude attack and corrosion of the metal by alkaline or acid contents and contamination of the contents by the reaction products.

Plastic tubes, on the other hand, are relatively inert and can be made by simple and inexpensive processes at high speeds. Unfortunately, the thin body wall of the plastics generally used is apt to be permeable in varying degrees to moisture, certain essential oils, perfumes, flavorings and other volatile ingredients. Consequently, there is often a considerable loss of the volatile oils and moisture during storage resulting in drying up of contained products such as tooth paste, shaving cream, medicinal ointments, etc. Even where permeability is not a factor, the plastic tubes have a further serious disadvantage in that printing or decorative material applied to the surface of the plastic will often not adhere satisfactorily and tends to flake or rub off easily. In most cases, it has been found that the plastic surface must be treated in some manner and at additional expense to render the surface receptive to inks.

An object of the present invention is to provide a collapsible dispensing tube which will overcome the problems hereinbefore pointed out.

Another object is to provide a tube which substantially combines the desired features of both the metal and the plastic tubes.

Another object is to provide a tube having a high retention for moisture and volatile oils.

Another object is to provide a tube having a surface to which printing and decorating inks adhere readily without the necessity for any prior surface conditioning treatment.

A further object is to provide a tube which can be produced at less expense and a lower material cost than tubes of conventional construction.

Numerous other objects and advantages of the invention will be apparent as it is better understood from the following description, which, taken in connection with the accompanying drawings, discloses a preferred embodiment thereof.

The above objects are accomplished in the present invention by providing a collapsible dispensing tube having a three-ply laminated body wall with inner and outer layers of a thermo-plastic material and an intermediate layer of preformed sheet material, e.g. thin metallic foil or paper. The metal foil, when used, can be made extremely thin while still preserving its impermeability to moisture, oxygen and volatile oils thereby serving the required purpose and at the same time minimizing the material cost. Furthermore, for highest economy, the foil extends around the tube in a single layer without overlap and with the area where the edges of the foil adjoin being formed into a side seam by fusing together the overlapping thermoplastic layers.

Where impermeability is not a requirement, an intermediate layer of paper or the like fiber material is used. Since paper and fiber surfaces are highly receptive to inks, the tube may be provided with a bright multicolor exterior appearance of the type customarily achievable on paper and not normally capable of production on plastic. This may also be accomplished without the necessity for the surface conditioning operation that plastic printing requires. Moreover, by imprinting the intermediate layer while it is still in web form and as part of the continuous tube forming operation, the processing costs are substantially reduced as compared to the cost of printing and decorating the individual tubes after they are formed.

The thermoplastic layers impart the required strength to the tube, provide an inert inner surface, and a protective outer surface for the printing or decoration which is applied to the intermediate layer prior to the lamination of the plastic layer thereto. The thermoplastic layers are also fused to a molded thermoplastic head to form an integral joint between the head and the tube body.

Referring to the drawings:

FIGURE 1 is a side view of a tube embodying the features of the present invention with portions of the body wall layers broken away to show the laminated structure;

FIGURE 2 is an end view taken substantially along line 2—2 of FIGURE 1;

FIGURE 3 is an enlarged partial sectional view showing the fused joint between the tube body and the head;

FIGURES 4 and 5 are plan and side views respectively schematically showing a method for continuously forming the tubes of the present invention;

FIGURES 6 and 7 are partial sectional views showing the side seam area of the tube before and after the application of heat and pressure;

Figure 8:
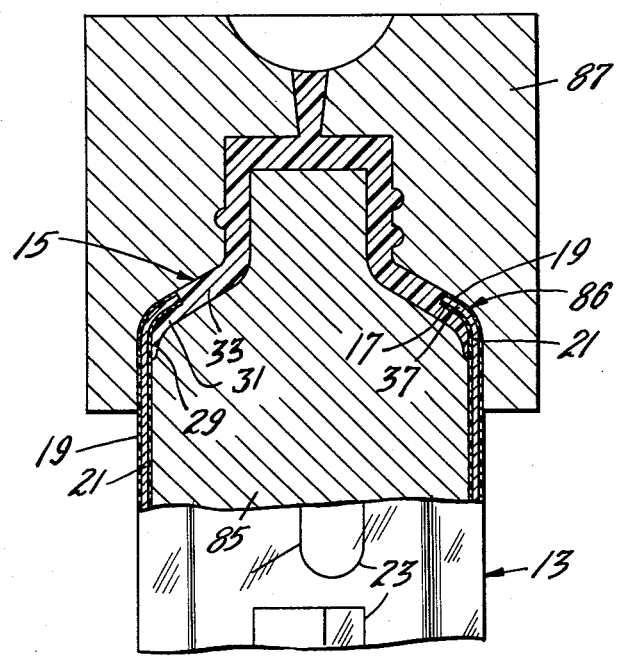
FIGURE 8 is a sectional view illustrating the step of injection molding the head with the tube body positioned in the mold.

As a preferred or exemplary embodiment of the instant invention, FIGURE 1 shows a collapsible tube generally designated 11 having a tubular body portion 13 and a head 15. The tube body 13 has a three-ply laminated structure consisting of inner and outer thermopalstic layers 17 and 19 respectively and an intermediate layer 21. The outer surface of the intermediate layer 21 is ornamented and imprinted 23 prior to the lamination of the outer thermoplastic layer 19 thereto, the outer plastic layer being transparent to allow the ornamentation and printing to show through.

The intermediate layer 21 extends substantially completely about the tube body 13 with its longitudinal edges 25 disposed contiguously in a longitudinally extending side seam 27 (FIGURES 2 and 7). In the inner and outer thermoplastic layers 17 and 19 respectively are fused in the area of the side seam 27 to form continuous slightly thickened portions 17a and 19a extending across the contiguous edges 25 of the intermediate layer 21.

The head 15 is formed from a thermoplastic material which is readily bonded or fused with the thermoplastic layers 17 and 19 of the tube body 13. The head 15 may have various configurations permitting various methods of attachment to the tube body 13. In the preferred embodiment shown in FIGURES 1 and 3, the head 15 is provided with a cylindrical skirt portion 29 and a peripheral inwardly curved portion 31 merging into a top portion 33 which carries an upstanding threaded discharge neck 35 all of sufficient thickness to be substantially rigid and dimensionally stable. The top portion 33 is generally frustoconical but may be of any desired shape, e.g., flat, spherical, etc. The neck 35 has an axial passage therethrough for dispensing or discharging the contents from the filled tube. The skirt portion 29 has substantially the same diameter as the inner diameter of the tube body 13 and is disposed within the tube body with the upper end 37 of the tube body curved inwardly to overlie the inwardly curved portion 31 of the head 15. The inner thermoplastic layer 17 of the tube body 13 is fused to the skirt portion 29 and the curved portion 31 of the head 15 to form a head joint 39 (FIGURE 3). The continuous peripheral and vertical fused areas of the joint 39 results in a strong attachment of the head 15 to the tube body 13 with a high resistance to separation by either axial, radial or twisting forces or combination thereof. Preferably, the upper end 37 of the tube body 13 is recessed into the head 15 and the outer layer 19 of the body is welded at its edge 41 to the material of the head so that the outer surface of the joint 39 is a smooth substantially uninterrupted surface.

In the method of forming the tube bodies 13 shown in FIGURES 4 and 5, a continuous base web 43 of thin material such as paper or metal foil is first passed through a printing unit 45 to apply printing and decoration forming a label design on the upper surface of the web. For simplicity, the printing unit 45 is shown with a single printing roll 47 and back-up roll 49. However, it is to be understood that multiple rolls for applying a multicolor design may be used.

The printed base web 43 passes between upper and lower plastic extrusion devices 51 and 53 from which plastic webs 55 and 57 respectively are being continuously extruded. The plastic webs 55 and 57 are brought into contact with the upper and lower surfaces of the base web 43 and laminated thereto by driven pressure rolls 59 to form a laminated web 61. Preferably, the rate of extrusion of the webs 55 and 57 is less than the linear velocity of the base web 43 and rolls 59 so that the extruded plastic webs are drawn down and thinned in the conventional manner prior to being laminated to the base web. The width of the extruded and drawn down plastic webs 55 and 57 is greater than the width of the base web 43 to provide narrow margins 63 of the plastic webs extending transversely beyond the longitudinal edges 65 of the base web.

The laminated web 61 next passes between a pair of driven rolls 67 and 69. The roll 67 has a plurality of cutting knives 71 mounted on the surface thereof along a line parallel to its axis of rotation and the surface of the roll 69 has a similarly positioned series of grooves 73. The knives 71 come into registry with and enter into the grooves 73 as the rolls 69 and 67 are rotated, periodically cutting a slit in the laminated web 61 on a line transverse to its longitudinal axis. The circumferential dimension of the rolls 69 and 67 is equal to the desired length of the tube bodies 13 so that the slits 75 are produced in the laminated web 61 at longitudinally spaced intervals equal to the desired length of the tube bodies.

The edges of the laminated web 61 are then directed downwardly around a cylindrical mandrel 77 to form the web into a tubular configuration with the plastic margins 63 overlapped and the longitudinal edges 65 of the base layer 43 in a contiguous relation as shown in FIGURE 6. The overlapped margins 63 are heated by suitable means such as a gas heater 79 and then compressed between the mandrel 77 and a pressure roller 81 to fuse the plastic layers thereby forming and sealing the seam 27. It is to be understood, of course, that the fusing of the overlapped plastic portions of the laminated web 61 may be accomplished using other conventional means as are well known in the art.

After the seam 27 is formed, the continuous tube is severed along the lines formed by the now circumferentially disposed slits 75 to produce the tube bodies 13 of the desired length. While the slits 75 facilitate the severing operation, it is to be understood that the severance of the continuously formed tube may also be accomplished by suitable means without providing the slits 75. As shown in FIGURES 4 and 5, a pair of oscillatable shear blades 83 are employed for the severing operation.

Various methods may be used to form and attach the head 15 to the tube body 13. For the preferred embodiment of the invention shown in FIGURES 1 and 3, the tube body 13 is placed on a mandrel 85 of an injection molding device with the end 37 of the tube body extending into and abutting an inwardly curved surface 86 of a female mold member 87 (FIGURE 8). The curved surface 86 of the mold member forms and bends the end 37 of the tube inwardly. While the end 37 is thus positioned and held in the mold, heated thermoplastic material is injected into the mold cavity to form the head 15 and simultaneously weld it to the thermoplastic layers 17 and 19 of the tube body 13 thereby forming the joint 39.

Figure 9:
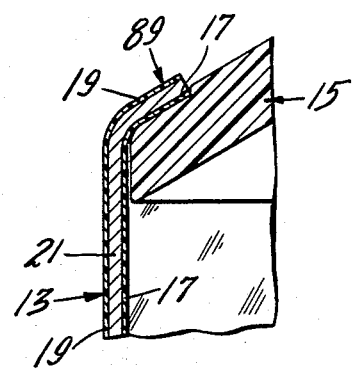
FIGURES 9 and 10 are sectional views similar to FIGURE 3 showing modified forms of the joint between the tube body and the head.
Figure 10:
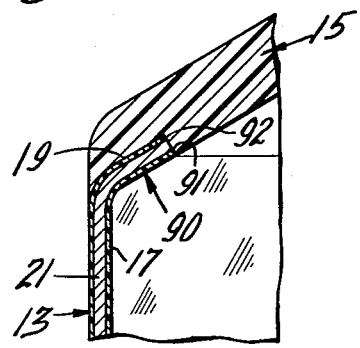

Alternative joint structures for attaching the head 15 to the tube body 13 are shown in FIGURES 9 and 10 which illustrate modified forms of the invention. With the structure shown in FIGURE 9, the head 15 is first molded by conventional molding means. In a separate subsequent operation, the head 15 is positioned within a tube body 13 with a short end portion 89 extending above the head. The end portion 89 is then forced inwardly against the head 15 and by the simultaneous application of heat and pressure the inner thermoplastic layer 17 of the end portion 89 is fused to the head.

The modified head 15 shown in FIGURE 10 is formed by an injection molding operation similar to that described for the preferred embodiment of the invention. However, instead of abutting the end of the tube against a surface of the female die, the end portion 90 of the tube is initially preformed so that it is seated upon or lies against the mandrel end surface. Consequently, when the thermoplastic head 15 is molded, it is simultaneously welded to the outer thermoplastic layer 19 of the end portion 90 and also to the edges 91 and 92 of the inner and outer layers 17 and 19 respectively.

After the completed tube 11 is filled through the open end of the tube body 13, the open end is closed and sealed using one of the methods which are well known in the art, as for example, compressing together and heating the edges of the body wall to fuse the thermoplastic layers together.

The tubes described substantially combine the desired features of conventional tubes without including their serious disadvantages. The process of manufacturing the subject tubes is greatly simplified by the elimination of the separate steps of internally coating and externally printing and decorating the individual tubes. With the conventional types of tubes made of metal or plastic, these additional steps are performed after the tube is completely formed requiring relatively expensive processing operations and extra handling.

With the subject tube, the printing and decoration are applied to the intermediate layer while it is in the flat form as the initial step of the continuous tube forming operation. The intermediate layer is a material which is readily imprinted, such as paper or metal foil. Consequently, no prior surface treatment to increase ink adherence is required as is the case where the printing or decoration is applied directly to a plastic surface and therefore the processing costs are substantially reduced. Moreover, the printing and decoration are sealed into the tube wall beneath the outer plastic layer and protected thereby from marring or scratching in the subsequent handling while the tubes are being filled, shipped, etc.

The same thermoplastic material, for example, polyethylene, may be used for the inner and outer laminations as well as for the head. The invention also contemplates using plastics having different properties for the inner and outer laminations. For example, a plastic highly resistant to chemical attack may be used for the inner wall of the tube and a high-strength plastic for the outer wall. Different plastics may be used in combination, in some instances to reduce the total cost of the finished tube and in others to provide specific properties. Specifically, it may prove desirable to make the inner lamination of nylon in cases where the product contains ingredients tending to permeate the inner layer and promote delamination.

Where protection against the loss of moisture and volatile ingredients from the substance to be packaged in the tubes is not required, an intermediate layer of paper may be used. If impermeability of the tube wall is a necessity, the intermediate layer is made from a metallic foil. The metal foil intermediate layer can be made extremely thin while still preserving its impermeability to moisture and volatile oils since the plastic layers impart the required strength to the tube. Consequently, the subject tube produces the desired results using a minimum of relatively costly metallic material. While some loss of moisture or volatile oils from the contents may take place through the plastic head and also through the narrow plastic area between the abutting edges of the metal foil in the body side seam, these losses will be very slight due to the fact that the plastic head is relatively thick and the portion of the side seam not covered by the foil, if it exists at all, will be extremely small in area. Moreover, the minor losses which may occur are far outweighed by the fact that the subject tubes will serve the required purpose efficiently and satisfactorily and can be produced at less expense than tubes of conventional construction.

It is thought that the invention and many of its attendant advantages will be understood from the foregoing description and it will be apparent that various changes may be made in the form, construction, and arrangement of the parts and that changes may be made in the steps of the method described and their order of accomplishment without departing from the spirit and scope of the invention or sacrificing all of its material advantages, the form hereinbefore described being merely a preferred embodiment thereof.

I claim:

1. A collapsible tube comprising a tubular body and a headpiece integrally molded to one end thereof, said body being formed of a preformed sheet including an intermediate layer impervious to the contents of said tube and mutually coextensive thermoplastic layers coextensively bonded to the inner and outer surfaces of said intermediate layer, said sheet being wound in a single convolution with its longitudinal marginal edges overlapped and fused together in a longitudinal side seam extending the full length of said body, said thermoplastic layers of each of said overlapped marginal edges being pressed together around the corresponding edge of said intermediate layer and fused to the underlying thermoplastic layer of the other marginal edge to form continuous, relatively thick thermoplastic portions on the inside and outside of said body enclosing the edges of said intermediate layer within said side seam.

2. The structure set forth in claim 1 wherein said thermoplastic material is polyethylene.

3. The structure set forth in claim 2 wherein said outer polyethylene layer is transparent and having printing media disposed between said outer layer and said intermediate layer.

4. The structure set forth in claim 3 wherein said intermediate layer is substantially impermeable to moisture and volatile oils.

5. The structure set forth in claim 3 wherein said intermediate layer is a metallic foil.

6. The structure set forth in claim 1 wherein said edges of said intermediate layer are disposed in closely spaced contiguous relation within said side seam and said relatively thick thermoplastic portions enclosing said intermediate layer edges are connected therebetween by a thin membrane of thermoplastic formed as a portion of said fused and pressed-together thermoplastic layers.

7. The structure set forth in claim 1 wherein said headpiece is of thermoplastic material and is fused to a substantial peripheral marginal end surface of one of said thermoplastic layers, said headpiece enclosing the end edges of said intermediate and thermoplastic layers and also being fused to the end edges of the thermoplastic layers.

8. The structure set forth in claim 7 wherein said headpiece includes an annular skirt portion disposed within the end of said body and fused to said marginal end surface of the inner thermoplastic layer, said body end being turned radially inwardly over said skirt portion with the end edge of the outer thermoplastic layer embedded in and flush with the top surface of said headpiece to provide a smooth, continuous fused juncture therewith.

References Cited in the file of this patent
UNITED STATES PATENTS

| | | |
|---|---|---|
| 773,995 | Seeser | Nov. 1, 1904 |
| 1,233,802 | Lowe et al. | July 17, 1917 |
| 2,176,109 | Ratay | Oct. 17, 1939 |
| 2,439,716 | Canfield | Apr. 13, 1948 |
| 2,460,756 | Koppel | Feb. 1, 1949 |
| 2,605,018 | Croce et al. | July 29, 1952 |
| 2,682,974 | Smith | July 6, 1954 |
| 2,741,079 | Rausing | Apr. 10, 1956 |
| 2,893,758 | Dufour | July 7, 1959 |
| 2,926,030 | Rozmus | Feb. 23, 1960 |